(12) United States Patent
Limia et al.

(10) Patent No.: US 6,224,534 B1
(45) Date of Patent: May 1, 2001

(54) TREATMENTS FOR CUTTINGS FROM OFFSHORE RIGS

(75) Inventors: Jose M. Limia, Spring; Lirio Quintero, Houston, both of TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/426,172

(22) Filed: Oct. 22, 1999

Related U.S. Application Data
(60) Provisional application No. 60/105,502, filed on Oct. 23, 1998.

(51) Int. Cl.[7] ............................. A62D 3/00; E21B 21/06
(52) U.S. Cl. .......................... 588/250; 134/40; 210/925; 175/66; 588/252
(58) Field of Search .................. 516/58, 110; 134/40; 588/250, 252, 255; 210/925; 175/66

(56) References Cited

U.S. PATENT DOCUMENTS

| | | | |
|---|---|---|---|
| 3,693,733 | * 9/1972 | Teague | 175/66 |
| 4,040,866 | 8/1977 | Mondshine | 134/26 |
| 4,175,039 | * 11/1979 | Fisher | 175/66 |
| 4,209,381 | 6/1980 | Kelly, Jr. | 134/19 |
| 4,242,146 | 12/1980 | Kelly, Jr. | 134/40 |
| 4,395,357 | 7/1983 | Kramer et al. | 502/401 |
| 4,460,292 | 7/1984 | Durham et al. | 175/66 |
| 4,469,603 | 9/1984 | Lepain et al. | 210/749 |
| 4,480,702 | 11/1984 | Kelly, Jr. | 175/66 |
| 4,597,893 | 7/1986 | Byford et al. | 516/59 |
| 4,599,117 | 7/1986 | Luxemburg | 134/25.1 |
| 4,645,608 | 2/1987 | Rayborn | 507/128 |
| 4,812,242 | 3/1989 | James et al. | 210/735 |
| 5,005,655 | 4/1991 | Stokke et al. | 175/66 |
| 5,076,938 | 12/1991 | Noonan et al. | 210/708 |
| 5,080,721 | * 1/1992 | Flanigan et al. | 134/40 |
| 5,156,686 | 10/1992 | Van Slyke | 134/26 |
| 5,213,625 | 5/1993 | Van Slyke | 134/26 |
| 5,402,857 | 4/1995 | Dietzen | 175/66 |
| 5,405,223 | 4/1995 | Sirevag | 405/128 |
| 5,422,011 | 6/1995 | Avila | 210/706 |
| 5,478,389 | * 12/1995 | Loomis | 516/145 |
| 5,564,509 | 10/1996 | Dietzen | 175/66 |
| 5,570,749 | 11/1996 | Reed | 175/66 |
| 5,622,920 | 4/1997 | Rivas et al. | 507/232 |
| 5,678,238 | 10/1997 | Billings et al. | 588/252 |
| 5,792,223 | 8/1998 | Rivas et al. | 44/302 |
| 5,839,521 | 11/1998 | Dietzen | 175/66 |
| 5,882,524 | 3/1999 | Storey et al. | 210/712 |

FOREIGN PATENT DOCUMENTS

| | | |
|---|---|---|
| WO91/05026 | 4/1991 | (WO) . |
| WO00/24844 | 5/2000 | (WO) . |

* cited by examiner

*Primary Examiner*—Richard D. Lovering
*Assistant Examiner*—Daniel S. Metzmaier
(74) *Attorney, Agent, or Firm*—Paula D. Morris & Associates, P.C.

(57) ABSTRACT

The invention provides a method for treating marine cuttings, preferably in situ, so that the cuttings can be discharged back into marine waters without causing oxygen depletion of marine sediment. In a preferred embodiment, the treatment emulsifies and then encapsulates free hydrocarbons in the marine cuttings.

31 Claims, No Drawings

TREATMENTS FOR CUTTINGS FROM OFFSHORE RIGS

This application claims the benefit of Application Ser. No. 60/105,502 filed Oct. 23, 1998.

FIELD OF THE INVENTION

The present invention relates to a method for in situ treatment of marine cuttings preferably drilled with invert emulsion drilling fluids to minimize the environmental impact of their discharge into the sea. The treated cuttings and associated hydrocarbons will disperse in the marine environment, eliminating the possibility of organic enrichment.

BACKGROUND OF THE INVENTION

During the drilling of oil and/or gas wells, a drill bit at the end of a rotating drill string, or at the end of a drill motor, is used to penetrate through geologic formations. During this operation, drilling mud is circulated through the drill string, out of the bit, and returned to the surface via the annular space between the drill pipe and the formation. Among other functions, the drilling mud provides a washing action to remove the formation cuttings from the wellbore. The mud returns to the surface along with entrained drill cuttings and typically flows through "shale shakers," desanders, desilters, hydrocyclones, centrifuges, and/or other known devices to separate the cuttings from the mud. The shale shaker(s), which typically sit above the mud storage area, essentially are screens that are used to separate the drill cuttings from the drilling mud. The drilling mud falls through the screens by gravity and the cuttings pass over the end of the screens.

Where drilling is offshore, the disposal of the drill cuttings after separation from the drilling mud can present a problem. The most economical way to dispose of the cuttings would be to simply discharge the cuttings back into the surrounding water. However, the cuttings may contain environmentally damaging "free hydrocarbons," defined herein as hydrocarbons derived either from the drilling mud, from the formation, or both. The potential for environmental contamination could be alleviated by transporting the cuttings to a disposal facility onshore; however, this would increase the cost of the drilling operation considerably, and would not necessarily improve the environmental performance of the drilling operation A typical approach to resolve the problem has been to minimize the toxicity of the base fluids used to make drilling muds, and more recently, to use base fluids which are more biodegradable. Unfortunately, this approach fails to prevent one type of damage that free hydrocarbons can inflict on a marine environment.

Free hydrocarbons are known to organically enrich marine sediment, which eventually causes oxygen depletion and destruction of the environment surrounding the depleted sediment. As with any other organic matter, hydrocarbons tend to break down or decompose in the presence of oxygen, forming carbon dioxide and water. Oxygen is a limiting resource for this reaction. Marine sediment typically has an oxygen content of only from about 2 to about 8 mg per liter of marine sediment. When drill cuttings containing a high concentration of hydrocarbons are discharged into marine waters and reach the sea floor, the oxygen available in the marine sediment rapidly is used to decompose the hydrocarbons. The resulting oxygen depletion very rapidly causes the marine sediment to become anoxic, creating an environment in which most benthic organisms cannot exist.

The potential for environmental damage could be reduced by treating the cuttings in situ before discharging the cuttings into marine waters. Methods are need for treating marine cuttings, preferably in situ, to reduce the quantity of hydrocarbons that will be accessible upon discharge to organically enrich marine sediment.

SUMMARY OF THE INVENTION

The invention provides a method for treating cuttings from an offshore rig comprising: providing cuttings produced during drilling of a marine wellbore, the cuttings comprising free hydrocarbons; treating the cuttings in situ to produce a converted cutting mixture in which the free hydrocarbons are unavailable to induce oxygen depletion of the marine sediment; and, discharging the converted cutting mixture into marine waters.

DETAILED DESCRIPTION OF THE INVENTION

According to the present invention, marine cuttings are treated, preferably in situ, to minimize their environmental impact upon discharge. The treatment forms a cutting mixture which will not result in oxygen depletion of marine sediment. In a preferred method, free hydrocarbons in the cuttings are converted into "isolated hydrocarbons," defined herein as hydrocarbons which are unavailable to organically enrich surrounding marine sediment in an amount sufficient to induce oxygen depletion of the marine sediment. For purposes of the present application, the term "oxygen depletion" is defined to mean depletion of oxygen in marine sediment to a level below that required to sustain a typical community of benthic aerobic organisms. Without limiting the invention, typical healthy marine sediments are believed to have an oxygen content of from about 2 mg $O_2$/liter to about 8 mg $O_2$/liter of sediment.

Isolated hydrocarbons may be formed in a number of ways, including but not necessarily limited to encapsulation of the free hydrocarbons with a suitable encapsulating material. In a preferred embodiment, free hydrocarbons in the drilled cuttings are encapsulated with an encapsulating material which renders the hydrocarbons wholly or partially inaccessible to biological degradation for a prolonged period of time. In a preferred embodiment, hydrocarbons in the drilling mud are non-toxic and biodegradable, and the encapsulating material allows some release of the hydrocarbons into the seawater at a rate which is sufficiently low as to allow the microorganisms in the surrounding environment to degrade the hydrocarbons without oxygen depletion of the marine sediment.

The drilled cuttings may be treated using any suitable system of equipment. After separation from the drilling mud, the contaminated cuttings typically pass through a holding bin into an inlet hopper. The cuttings preferably are treated directly in a batch mixer equipped with an appropriate inlet for the relevant solutions and an apparatus for low shear mixing, such as a paddle mixer.

In a preferred embodiment, the cuttings are sprayed with an emulsifyng solution effective to transform the free hydrocarbons in the cuttings into an emulsion. The emulsion thereafter is treated with an encapsulating material to encapsulate the emulsified hydrocarbons.

The composition of the emulsifying solution will vary depending upon the type of free hydrocarbons found in the drilling mud, and may be similar to the emulsifiers used in U.S. Pat. No. 5,076,938, incorporated herein by reference. However, the following emulsifiers were found are superior to those described in U.S. Pat. No. 5,076,938 because of (a) environmental compatibility, and (b) stability of the emulsion. The emulsifying solution may be a blend of organic acids, inorganic acids, and emulsifiers. The emulsifier(s) may have any ionic nature, including non-ionic, anionic, and cationic. Preferred emulsifying solutions are as non-toxic as possible, and preferably comprise either a non-ionic emulsifier (where the drilling mud comprises paraffins) or, a combination of at least a non-ionic surfactant and most preferably a non-ionic and an anionic emulsifier (where the drilling system does not comprise paraffins). Although the compounds called "emulsifiers" herein typically are referred to as surfactants, their function in the present invention is to act as emulsifiers. The emulsifying solution lowers the interfacial tension between the oil and water to produce a sufficiently small droplet size, from about 3 microns to about 20 microns, preferably about 10 microns or less in diameter.

Preferred emulsifying solutions comprise: from about 15 wt % to about 45 wt %, preferably about 20 wt % phosphoric acid, or another acidic composition with similarly low toxicity; about 5 wt % to about 90 wt %, preferably about 65 wt % emulsifiers; and water. In order to achieve the desired small droplet size, it is necessary to use emulsifiers with the correct hydrophilic/lipophilic balance (HLB). The required HLB will differ depending upon the oil being emulsified. In a preferred embodiment, the required HLB is achieved using a non-ionic emulsifier. Preferred non-ionic emulsifiers include, but are not necessarily limited to polyoxyethylene alcohols comprising from about 8 to about 30, preferably about 8 to about 20 carbon atoms and comprising about 3 to about 50 moles, most preferably about 3 to about 20 moles ethylene oxide. The following are preferred HLB's for non-ionic emulsifiers when the drilling mud contains the following oils: polyalphaolefins and paraffins—HLB 12.5; esters—HLB-15.4; synthetic iso-paraffins—HLB 10.9.

Blends of both non-ionic and anionic emulsifiers have been found to decrease droplet size in most instances. Where such a blend is used, a preferred ratio of non-ionic to anionic emulsifier is about 5/95 to about 95/5, preferably about 70/30 to about 95/5. Any suitable, non-toxic anionic emulsifier may be used in such blends. Preferred anionic emulsifiers include, but are not necessarily limited to those selected from the group consisting of: alkane sulfates and alkane sulfonates comprising about 8 to about 18 carbon atoms, preferably about 8 to about 12 carbon atoms.

The following are preferred emulsifying blends for use with the specified type of drilling muds. The drilling muds indicated by brand name are available from Baker Hughes INTEQ, and the brand name represents a proprietary trademark of Baker Hughes INTEQ):
For use with a driling mud comprising polyalphaolefins (SYN-TEQ) (blend of emulsifiers with HLB 12.5):

| | |
|---|---|
| Secondary alkanesulfonate of sodium or Sodium octyl sulfate | 9.75 wt % |
| Isodecyl alcohol ethoxylate with 6 moles of ethylene oxide | 55.25 wt % |
| Water + Phosphoric acid (at 75%) | 35 wt % |

Ratio of (Isodecyl alcohol ethoxylate with 6 moles of EO) to (secondary alkanesulfonate of sodium or Sodium Octyl Sulfate)=85:15
Ratio of active emulsifier to phosphoric acid=3:23
For use with an ester-containing drilling mud (blend of emulsifiers with HLB 15.4)

| | |
|---|---|
| Sodium Octyl Sulfate | 6.50 wt % |
| Oleyl alcohol ethoxylate with 20 moles of ethylene oxide | 58.50 wt % |
| Water + Phosphoric acid (at 75%) | 35 wt % |

Ratio of (Oleyl alcohol ethoxylate with 20 moles of EO) to Sodium octyl sulfate =90:10
For use with a paraffin-containing mud (PARA-TEQ) (emulsifier with HLB 12.5)

| | |
|---|---|
| Isodecyl alcohol ethoxylate with 6 moles of ethylene oxide | 55.25 wt % |
| Secondary alkanesulfonate of sodium or sodium octyl sulfate | 9.75 wt % |
| Water + Phosphoric acid (at 75%) | 35 wt % |

For use with a synthetic isoparaffin-containing mud (blend of emulsifiers with HLB 10.9)

| | |
|---|---|
| Isotridecyl ethoxylate with 3 moles of ethylene oxide (HLB 8) | 32.5 wt % |
| Isotridecyl ethoxylate with 10 moles of ethylene oxide (HLB 13.8) | 32.5 wt % |
| Water + Phosphoric acid (at 75%) | 35 wt % |

Ratio of Isotridecyl ethoxylate with 3 moles of EO/Isotridecyl ethoxylate with 10 moles of EO=50/50

An excess of the emulsifier solution is added to the cuttings, preferably in the inlet hopper. The amount of emulsifier added will depend upon the concentration of free hydrocarbons m the cuttings as measured by any suitable means, such as "retort," or distillation and measurement of the oil content. After addition of the emulsifyng solution, the wt/wt ratio of emulsifing blend in the cuttings should be about 0.2 wt % to about 5 wt % for cuttings contaminated with from about 2 wt % to about 18 wt % free hydrocarbons, respectively. The cuttings and emulsifying solution may be agitated so that substantially all of the free hydrocarbons are removed from the cuttings and emulsified or dispersed in the emulsifier solution. Thereafter, the encapsulating material is added.

The encapsulating material may be substantially any encapsulating material that surrounds the emulsified hydrocarbon droplets and solidifies. Suitable encapsulating materials include, but are not necessarily limited to silicates and polymeric microencapsulating materials. A preferred encapsulating material is a silicate solution.

A preferred silicate solution has the following composition:

| | |
|---|---|
| Potassium or Sodium Silicate | 33–58 wt % |
| Waterglass solution | 0.01 to 2.0 wt % |
| Aluminum Trihydrate | 0.01 to 2.0 wt % |
| Titanium | 0.01 to 2.0 wt % |
| Glycol | 1.0 to 4.0 wt % |
| Water | Balance |

The amount of silicate solution that is added to the emulsified solution preferably is about 1 to about 2 times the amount of emulsifying solution added.

The emulsifier rapidly and substantially completely disperses the free hydrocarbons in the cuttings into small droplets. Application of the silicate solution to the emulsified oil converts the emulsified oil into a thick gel, which can be water-washed off of the cuttings, leaving a substantially clean surface. When allowed to dry, the gel is even more amenable to subsequent removal by water-washing.

Because the emulsifier removes hydrocarbons (hydrophobic materials) from the cuttings and because the emulsifing solution is very hydrophilic, the wettability of the cuttings is changed from oil wettable to water wettable. The more hydrophilic cuttings have less tendency to agglomerate, and tend to more widely disperse, both in the seawater as they travel toward the ocean floor, and eventually in the marine sediment.

The combination of (a) encapsulation of free hydrocarbons from the cuttings (which decreases accessibility to the hydrocarbons over time), and (b) change in the wettability of the cuttings from oil wet to water wet (which results in greater spatial dispersion of the hydrocarbons) greatly minimizes the organic load on the marine sediment and helps to prevent oxygen depletion.

Persons of skill in the art will appreciate that many modifications may be made to the embodiments described herein without departing from the spirit of the present invention. Accordingly, the embodiments described herein are illustrative only and are not intended to limit the scope of the present invention.

We claim:

1. A method comprising:
providing cuttings produced during drilling of a marine wellbore, said cuttings comprising free hydrocarbons; and,
treating said cuttings with a composition effective to disperse said free hydrocarbons into droplets having a diameter of about 20 microns or less producing dispersed free hydrocarbons;
encapsulating said dispersed free hydrocarbons, thereby producing a converted cutting mixture comprising isolated hydrocarbons effective to disperse upon discharge into marine waters; and,
discharging into said marine waters said converted cutting mixture comprising said isolated hydrocarbons.

2. The method according to claim 1 wherein said emulsified droplets are about 3 microns to about 20 microns in diameter.

3. The method according to claim 1 wherein said emulsified droplets are about 10 microns or less in diameter.

4. A method comprising:
providing cuttings produced during drilling of a marine wellbore, said cuttings comprising free hydrocarbons; and,
treating said cuttings with a composition effective to emulsify said free hydrocarbons and to produce emulsified droplets comprising said free hydrocarbons;
encapsulating said emulsified droplets, thereby producing a converted cutting mixture comprising isolated hydrocarbons effective to disperse upon discharge into marine waters; and
discharging into said marine waters said converted cutting mixture comprising said isolated hydrocarbons.

5. The method of claim 4 wherein said encapsulating material is a silicate.

6. The method of claim 5 wherein said treating also changes wettability of said cuttings from oil wettable to water wettable.

7. The method according to claim 5 wherein said emulsified droplets are about 3 microns to about 20 microns in diameter.

8. The method according to claim 5 wherein said emulsified droplets are about 10 microns or less in diameter.

9. The method of claim 4 wherein said treating also changes wettability of said cuttings from oil wettable to water wettable.

10. The method according to claim 4 wherein said emulsified droplets are about 3 microns to about 20 microns in diameter.

11. The method according to claim 4 wherein said emulsified droplets are about 10 microns or less in diameter.

12. A method for treating cuttings from an offshore rig comprising:
providing cuttings produced during drilling of a marine wellbore, said cuttings comprising free hydrocarbons; and,
treating said cuttings to produce a converted cutting mixture comprising encapsulated free hydrocarbons which are unavailable to induce oxygen depletion of said marine sediment; and
discharging said cutting mixture comprising said encapsulated free hydrocarbons into said marine waters;
wherein said treating comprises
mixing an acidic emulsifying solution with said cuttings to form a stable emulsion comprising droplets comprising said free hydrocarbons;
adding to said stable emulsion an aqueous solution of a water soluble silicate to form silica shells surrounding said droplets.

13. The method of claim 12 wherein said droplets are about 3 microns to about 20 microns in diameter.

14. The method of claim 12 wherein said droplets are about 10 microns or less in diameter.

15. The method of claim 12 wherein said emulsifiers solution comprises emulsifiers and said emulsifiers are selected from the group consisting of non-ionic emulsifiers and a combination of non-ionic emulsifiers with anionic emulsifiers.

16. The method of claim 13 wherein said emulsifying solution comprises emulsifiers and said emulsifiers are selected from the group consisting of non-ionic emulsifiers and a combination of non-ionic emulsifiers with anionic emulsifiers.

17. The method of claim 14 wherein said emulsifying solution comprises emulsifiers and said emulsifiers are selected from the group consisting of non-ionic emulsifiers and a combination of non-ionic emulsifiers with anionic emulsifiers.

18. The method of claim 15 wherein said anionic emulsifiers are selected from the group consisting of alkane sulfates and alkane sulfonates comprising about 8 to about 18 carbon atoms; and, said non-ionic emulsifiers comprise polyoxyethylene alcohols.

19. The method of claim 16 wherein
said anionic emulsifiers are selected from the group consisting of alkane sulfates and alkane sulfonates comprising about 8 to about 18 carbon atoms; and,
said non-ionic emulsifiers comprise polyoxyethylene alcohols.

20. The method of claim 17 wherein
said anionic emulsifiers are selected from the group consisting of alkane sulfates and alkane sulfonates comprising about 8 to about 18 carbon atoms; and,
said non-ionic emulsifiers comprise polyoxyethylene alcohols.

21. The method of claim 18 wherein said polyoxyethyene alcohols comprise from about 8 to about 30 carbon atoms and from about 3 to about 50 moles ethylene oxide.

22. The method of claim 19 wherein said polyoxyethylene alcohols comprise from about 8 to about 30 carbon atoms and from about 3 to about 50 moles ethylene oxide.

23. The method of claim 20 wherein said polyoxyethylene alcohols comprise from about 8 to about 30 carbon atoms and from about 3 to about 50 moles ethylene oxide.

24. The method of claim 15 wherein said emulsifying solution comprises a blend of non-ionic emulsifier and anionic emulsifier at a ratio of about 50/50 to about 95/5.

25. The method of claim 16 wherein said emulsifyng solution comprises a blend of non-ionic emulsifier and anionic emulsifier at a ratio of about 50/50 to about 95/5.

26. The method of claim 17 wherein said emulsifying solution comprises a blend of non-ionic emulsifier and anionic emulsifier at a ratio of about 50/50 to about 95/5.

27. The method of claim 15 wherein said emulsifying solution comprises a blend of non-ionic emulsifier and anionic emulsifier at a ratio of about 70/30 to about 95/5.

28. The method of claim 16 wherein said emulsifying solution comprises a blend of non-ionic emulsifier and anionic emulsifier at a ratio of about 70/30 to about 95/5.

29. The method of claim 17 wherein said emulsifying solution comprises a blend of non-ionic emulsifier and anionic emulsifier at a ratio of about 70/30 to about 95/5.

30. The method of claim 22 wherein said emulsifying solution comprises a blend of non-ionic emulsifier and anionic emulsifier at a ratio of about 70/30 to about 95/5.

31. The method of claim 23 wherein said emulsifying solution comprises a blend of non-ionic emulsifier and anionic emulsifier at a ratio of about 70/30 to about 95/5.

* * * * *